June 2, 1959  W. RODENACKER ET AL  2,889,211
CONTINUOUS POLYMERIZING APPARATUS
Filed Aug. 9, 1955
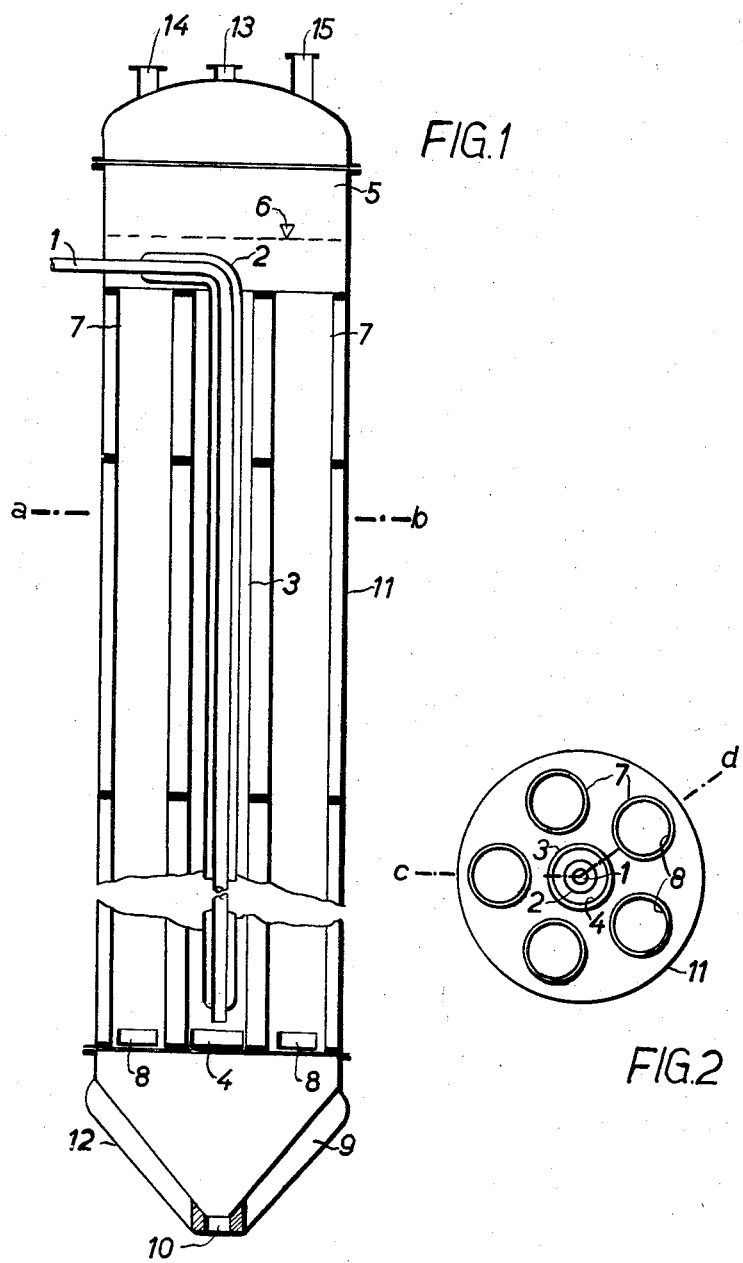
INVENTORS:
WOLF RODENACKER, ERICH ISTEL, ROBERT SCHNEGG.
BY Connolly and
their ATTORNEYS United States Patent Office 2,889,211
Patented June 2, 1959

2,889,211

CONTINUOUS POLYMERIZING APPARATUS

Wolf Rodenacker, Erich Istel, and Robert Schnegg, Dormagen, Germany, assignors to Farbenfabriken Bayer Aktiengesellschaft, Leverkusen, Germany, a corporation of Germany Application August 9, 1955, Serial No. 527,234

Claims priority, application Germany September 24, 1954

4 Claims. (Cl. 23—283)

The present invention relates to the continuous production of polyamide from caprolactam and more particularly to a novel and improved method and apparatus for continuously polymerizing caprolactam.

It is known to produce polyamide from caprolactam, for example, a monomeric fluid such as by passing the lactam continuously through a heated reaction tube. Accelerators for the reaction like water and viscosity stabilizers may be added to the lactam. It is difficult to obtain a high efficiency with the known apparatus for performing this process. It has been found that it is not feasible to make the diameter of the tube larger than 300 to 400 millimeters, since otherwise an undesired mixing of the polyamide melt occurs unless care is taken that the speed of flow of the melt is very slow.

It is therefore an object of the present invention to provide a new process and apparatus which avoids these disadvantages. A further object is the provision of an apparatus for the continuous polymerization of caprolactam, which works efficiently and with an increased output of polyamide per unit of time.

Further objects will become apparent as the following specification proceeds.

We have found that these objects may be accomplished by passing the lactam with the addition of up to 5% water first with increased speed through a vertically ascending tube and then introducing the lactam in to several parallel tubes in which it descends vertically, these tubes all having the same level of melt and opening into a common vapor chamber. In the descending tubes the polyamide forming reaction of the lactam is performed with a slower speed of flow. The time in which the melt passes the descending tubes must be considerably greater than the time in which it passes through the ascending tube. Owing to the fact that the preponderant amount of water evaporates in the ascending tube, the melt in the descending tubes has a smaller specific gravity since in these tubes only a small amount of bubbles are formed. The smaller specific gravity is compensated by means of throttles at the lower end of the descending tubes so that any desired time of passage through these tubes can be easily adjusted.

Novel features and advantages of the present invention will become apparent to one skilled in the art from a reading of the following description in conjunction with the accompanying drawing in which:

Fig. 1 is a diagrammatic cross-sectional view in elevation of an embodiment of this invention taken through Fig. 2 along the line c—d; and Fig. 2 is a cross-sectional view taken through the embodiment of the invention shown in Fig. 1, for example, along the line a—b.

Referring now to Figure 1, the lactam is introduced by means of the introductory tube 1, which is thermally insulated by the cover 2, at the lower end of the ascending tube 3. The ascending tube is closed by a stopper 4 against the collector 9. The mixture of lactam, water and viscosity stabilizer passes upwards through the tube 3 and reaches the evaporating chamber 5 in which the melt level 6 is maintained. The melt then flows into the descending tubes 7 which are concentrically arranged with respect to the tube 3. The descending tubes 7 have arranged at their lower ends the throttles 8. By adjusting the throttles the time of passage of the melt through the descending tubes can be adjusted at will. The completely polymerized melt passes through the throttles into the collector 9. This collector combines the melts from all the descending tubes. The melt can be removed from the opening 10 at the lower end of the collector. The tubes have a common heating shell 11, which is subdivided into individual heating zones, and collector 9 is surrounded by an insulating jacket 12. The heating as such can be steam heating or a circulatory liquid heating. At the upper end of the evaporating chamber there are preferably arranged openings 13, 14 and 15 for introducing and removing liquids which can serve to remove water and monomeric lactam, if desired, by applying reduced pressure. Through these openings an inert gas like nitrogen may be introduced. If desired, additives like pigments, accelerators or viscosity stabilizers may be introduced into the melt through these openings.

In the apparatus described the preponderant amount of the water contained in the lactam evaporates in the ascending tube. The bubbles of vapor, which are formed in a lesser amount in the descending tubes also mount up into the same evaporating chamber. The lactam polymerizes in the ascending tube so that the mixture contains less than 20 percent of monomer. The degree of polymerization desired is then adjusted in the descending tubes. The apparatus according to the invention renders it possible to vary the amount of liquid passing therethrough per hour, and to carry out the polymerization uniformly, especially as regards the viscosity of the final melt obtained. By assembling all the tubes in a single heating shell the heating of the melt is carried out economically.

The polyamides obtained are especially adapted for the production of filaments, fibres and foils owing to their uniform qualities of stability and viscosity.

*Example 1*

A mixture of 100 parts by weight of caprolactam
1 part by weight of water and
0.25 part by weight of acetic acid is introduced continuously at the lower end of the ascending tube with a speed of 50 liters per hour. The mixture moves upwards with moderate evaporation of water, polymerization occurring at the same time. After an hour the mixture contains 90 percent lactam and 10 percent of polyamide. The polyamide has a relative viscosity of 1.3, the amino equivalent weight amounts to 2540, the carboxylic equivalent weight to 2440. After a time of passage of 6 hours the polyamide has reached the upper end of the ascending tube the level of melt being about 10 centimeters above the upper ends of the tubes. It passes into the descending tubes, the water still contained in the melt evaporating to a large extent. At this time, after about 10 hours, the melt consists of about 85 percent polymer, the balance being cyclic monomers. The relative viscosity of the melt amounts to 2.15, the amino equivalent weight is about 23,000, the carboxylic equivalent weight about 12,000. The melt flows slowly downwards in the descending tubes, only relatively few bubbles ascending in the opposite direction. The melt is collected in the conical collector and leaves the apparatus after an average time of passage of about two days. About 1.2 tons of caprolactam thus pass through in a day. The finished melt has a content of extractable monomers of 10.2 percent. The relative viscosity of the polyamide amounts to 2.35, the amino equivalent weight is 35,500, the carboxylic equivalent weight is 14,500. The melt still contains about 0.4 percent of water.

*Example 2*

As in Example 1 a mixture of 100 parts by weight of caprolactam
    1 part by weight of water and
    0.25 part by weight of acetic acid is polymerized with a speed of passage of 150 liters per hour. The melt leaves the upper part of the ascending tube with an amount of polymer of about 30 percent, the balance being lower polymer and monomer. In slowly passing downwards through the descending tubes the melt is finally polymerized. After a time of passage of all together 16.3 hours, the completely uniform polyamide is removed from the apparatus. The melt contains about 0.4 percent of water and has the following characteristics:

Content of cyclic monomer, 10.6 percent
    Relative viscosity, 2.34
    Amino equivalent weight, 33,600
    Carboxylic equivalent weight, 14,050

The daily output amounts to 3.6 tons. Although the output is three times as large as in Example 1, the polyamide is uniform throughout and its characteristics correspond to those obtained with a lower output per day.

*Example 3*

As in Example 1 a mixture of 100 parts by weight of caprolactam
    1 part by weight of water and
    1.5 parts of stearylamine is continuously polymerized with a speed of passage of 100 liters per hour. When the melt passes from the polymerization tube into the evaporating chamber, it is freed of water by applying a vacuum of about 50 milliliters Hg so that in descending into the five descending tubes the molecular weight is nearly reached which corresponds theoretically to the amount of added stearyl amine. After a time of passage of 24 hours the polyamide leaves the apparatus with the following characteristics:

Content of cyclic monomer, 9.5 percent
    Relative viscosity, 2.62
    Amino equivalent weight, 15,400

The polyamide is practically free of carboxylic acid groups and is especially uniform.

We claim:

1. An apparatus for the continuous polymerization of a fluid mixture comprising a casing, an evaporating chamber disposed within the upper end of said casing, an ascending tube and a plurality of descending tubes vertically disposed within said casing, the upper ends of all of said tubes being connected to said evaporating chamber, the lower end of said ascending tube being sealed, throttle means being operatively associated with the lower ends of said descending tubes, a collecting chamber connected to the lower end of said casing for receiving fluid discharged from the lower ends of said descending tubes, fluid conduit means disposed adjacent the lower end of said ascending tube for introducing a supply of monomeric fluid into the bottom of said ascending tube, and the total cross-sectional area of said descending tubes being sufficiently greater than the cross-sectional area of said ascending tube to allow the level of fluid in said evaporating chamber to be controlled and the rate of flow of fluid through said descending tubes to be retarded to a rate which is slower than the rate of flow through said ascending tube by adjustment of said throttle means.

2. An apparatus as set forth in claim 1 wherein said conduit passes through said casing into the upper end of said ascending tube and extends substantially to the bottom of said ascending tube for supplying a flow of monomeric fluid thereto, and an insulating layer is disposed about the outside of said conduit for maintaining the fluids within said conduit and said ascending tube at separate optimum processing temperatures.

3. An apparatus as set forth in claim 1 wherein said descending tubes are concentrically disposed about said ascending tube, concentric heating shells are disposed about and within said descending tubes for maintaining all of said tubes at optimum processing temperatures, and separating means are disposed at predetermined vertical positions within said jacket to provide individual heating zones whose temperature may be varied to provide optimum processing temperatures at predetermined levels within said ascending and descending tubes.

4. An apparatus as set forth in claim 1 wherein said common evaporating chamber includes apertures for introducing additives to the fluid disposed within said evaporating chamber and for removing fluids therefrom.

References Cited in the file of this patent

UNITED STATES PATENTS

| | | |
|---|---|---|
| 1,741,309 | Jaeger | Dec. 31, 1929 |
| 2,042,632 | Reynolds | June 2, 1936 |
| 2,089,038 | Pyzel | Aug. 3, 1937 |